United States Patent [19]

Mercurio

[11] Patent Number: 4,497,500
[45] Date of Patent: Feb. 5, 1985

[54] SPRING ACTION RIDE-ON TOY

[75] Inventor: Frank Mercurio, Wallingford, Conn.

[73] Assignee: Coleco Industries, Inc., Hartford, Conn.

[21] Appl. No.: 510,961

[22] Filed: Jul. 5, 1983

[51] Int. Cl.$^3$ ............................................. A63G 19/00
[52] U.S. Cl. ..................................... 280/1.13; 104/61; 267/20 C; 267/178; 280/1.182; 280/1.192; 280/1.194; 280/218; 280/226 A; 403/361; D21/75; D21/165
[58] Field of Search ................. 280/1.13, 1.182, 1.165, 280/1.167, 1.183, 1.188, 1.189, 1.191, 1.192, 1.194, 218, 226 A, 242 R, 252; D21/70, 75, 165; 403/161, 162, 163, 164, 361; 104/61; 267/20 R, 20 C, 60, 166, 174, 178

[56] References Cited

U.S. PATENT DOCUMENTS

| | | | |
|---|---|---|---|
| D. 145,324 | 7/1946 | O'Connor et al. | D21/75 |
| D. 173,561 | 11/1954 | Fields et al. | D21/75 X |
| 941,301 | 11/1909 | Birky | 280/250 X |
| 1,977,317 | 10/1934 | Maypole | 280/218 |
| 2,136,752 | 11/1938 | Neilson | 280/226 A |
| 2,473,295 | 6/1949 | O'Connor et al. | 280/1.192 |
| 2,668,579 | 2/1954 | Swengel | 272/52 |
| 2,685,759 | 8/1954 | Ravich et al. | 403/162 X |
| 2,738,199 | 3/1956 | Rand | 280/1.182 |
| 2,768,833 | 10/1956 | Sidoff | 280/1.182 |
| 2,883,202 | 4/1959 | Morgan | 280/1.194 |
| 3,074,731 | 1/1963 | Jenne | 280/226 A X |
| 3,096,990 | 7/1963 | Thoren | 280/1.182 |
| 3,099,895 | 8/1963 | Beebe | 403/164 X |
| 3,229,995 | 1/1966 | Greider | 280/218 |
| 3,423,105 | 1/1969 | Kerstholt et al. | 280/218 |
| 3,511,520 | 5/1970 | Dunlap | 280/226 A X |
| 3,811,695 | 5/1974 | Curtis | D21/70 X |
| 3,999,771 | 12/1976 | Lohr | 280/1.13 |
| 4,066,271 | 1/1978 | Lohr | 280/1.182 |

Primary Examiner—Joseph F. Peters, Jr.
Assistant Examiner—Mitchell J. Hill

[57] ABSTRACT

An animal-simulating child's ride-on toy has head and foreleg members that are capable of being turned independently of the body, and has a unique suspension system that is accommodated in the body without disfiguring structure, thereby enhancing the lifelike appeal of the toy. The construction consists of relatively few parts which can be assembled with desirable ease, and production is relatively facile and inexpensive.

8 Claims, 8 Drawing Figures

SPRING ACTION RIDE-ON TOY

BACKGROUND OF THE INVENTION

Ride-on toys for young children are frequently designed to simulate horses and other animals. Such toys have conventionally employed a frame-supported spring suspension to permit a bouncing action, or they have been mounted on wheels for rolling; in some instances, prior art toys have been constructed to enable both modes of movement.

Exemplary of the relevant art are the following U.S. Pat. No. 1,977,317 to Maypole; U.S. Pat. No. 2,668,579 to Swengel; U.S. Pat. No. 2,738,199 to Rand; U.S. Pat. No. 2,768,833 to Sidoff; U.S. Pat. No. 3,096,990 to Thoren; U.S. Pat. No. 3,229,995 to Grieder; U.S. Pat. No. 3,423,105 to Kerstholt et al; and U.S. Pat. Nos. 3,999,771 and 4,066,271, both to Lohr. Although toys constructed in accordance with the disclosures of the foregoing may be entirely satisfactory for some purposes, they do tend to be deficient, in at least certain respects.

For example, it is believed that the most lifelike appeal will be provided by an animal model that has realistically simulated head and foreleg parts, which can be turned as a unit relative to the body; the art does not adequately provide such a structure. The suspension system of such a toy must be reliable and durable, and must be designed to permit movement to occur in a manner that will provide maximum enjoyment to the child. It should also require no adaptive body features that would unduly increase the cost of manufacture or detract from the lifelike appearance of the animal, and it the suspension so limit movement that risk of damage, such as through contact of the body with the floor, is minimized. Finally, because such toys are normally sold in a disassembled condition, the parts should be few in number, and designed for easy assembly.

Accordingly, it is a primary object of the present invention to provide a novel ride-on toy which realistically simulates an animal, and especially a horse.

It is a more particular object of the invention to provide such a toy in which the body member is fabricated separately from the head and foreleg members, which members can readily be assembled to one another for sturdy and positive independent steering action.

It is also an object of the invention to provide such a novel toy which utilizes a unique suspension system comprised of a minimum number of components, which system is readily assembled, affords improved performance, and does not require unnatural looking or expensive body modifications.

Additional objects are to provide such a toy in which the parts are relatively few in number and are quickly and easily assembled, and which is relatively inexpensive to produce.

SUMMARY OF THE INVENTION

It has now been found certain of the foregoing and related objects of the invention are readily attained by the provision of a child's ride-on toy, which includes a rigid body member of hollow construction, and separate head and leg members mounted thereon. The body member is comprised of upper and lower walls, each of which has a relatively large circular opening formed therethrough to define a pair of generally vertically aligned seat portions in the forward part of the member. The head member extends downwardly through the opening in the upper wall of the body member, and the leg member extends upwardly through the opening in the lower wall. Both the head member and leg member have cylindrical bearing portions thereon, which are received within the seat portions of the top and bottom walls, respectively, for pivotable movement relative to the body member. Means is provided for interengaging the head and leg members in assembly against relative rotation and axial displacement, and first and second ground-engaging wheel means are provided on the leg member and on a rearward part of the body member.

In preferred embodiments, the interengaging means for the head and leg members comprises a post portion extending axially from one of them, and a receptacle portion provided on the other one thereof. The internal dimensions and configuration of the receptacle portion conform closely to the external dimensions and configuration of an end section of the post portion, to permit insertion of the end section axially into the receptacle portion, and to prevent relative rotation between the head and leg members. The leg member may, more specifically, comprise an upper central section in which the receptacle portion is formed, and a pair of laterally spaced depending legs between which the receptacle portion projects. In such a construction the interengaging means may include at least one fastener which extends through the receptacle portion and the post portion end section, joining them to one another.

The lower end surface of each leg of the leg member will desirably define a downwardly opening groove which extends partially thereacross from the inner edge of the leg. The grooves will be laterally aligned to receive the opposite ends of a wheel axle, and a cap will be secured thereover to retain the axle ends in the grooves. Most desirably, each such retaining cap will include a laterally inwardly extending projection defining an upwardly opening groove therein, which will cooperate the grooves of the legs to support the axle end portions. The inner ends of the projections will be spaced from one another to define a free length of the axle therebetween, so as to maintain the wheel in a centered position thereon.

Additional objects of the invention are realized by the provision of such a toy in which an opening is formed through the lower wall, toward the rear of the body member, and in which the second, ground-engaging wheel means comprises a generally Y-shaped suspension member. The suspension member will include a neck portion, a pair of shoulder portions extending in opposite directions from one end of the neck portion, and an arm portion extending from the outer end of each of the shoulder portions, in a direction that is generally opposite to that of the neck portion. The shoulder portions of the suspension member pivotably support the body member of the toy, the neck portion extends generally upwardly therefrom through the lower wall opening, and the arm portions extend generally downwardly from the shoulder portions and have wheel members rotatably mounted adjacent the lower ends thereof. Such a suspension member will also include a head portion extending generally forwardly and downwardly from the opposite end of said neck portion, and a biasing member secured to the head member. The biasing member will normally bear upon an inside surface portion of the lower wall of the body member, so as to exert an upward bias upon the head portion and a downward bias upon the arm portions of the suspension member. As a result, the weight and inertia of a child and the force of the biasing member will permit a bouncing action mode of movement in the body member.

Most desirably, the lower wall of the body member of the foregoing embodiment will include an integrally formed reinforcing element extending thereabout. The reinforcing element will define groove portions extending laterally from the opposite sides of the opening, to seat the shoulder portions of the suspension means for pivotable support of the body member thereon. Generally, the biasing member utilized will be a coil spring, and the toy will include a connecting fixture to secure the coil spring to the head portion of the suspension means. The fixture will, more specifically, comprise a circular body portion dimensioned for axial insertion into one end of the coil spring, and will have an axial bore therethrough in which is received the free end section of the head portion. The body will have at least one pair of radially outwardly biased flexible fingers diametrically disposed thereon, and the fixture will have a cap portion at the upper end of the body portion. Elements configured to enter the space between adjacent turns of the spring will be provided on the flexible fingers, and the cap portion will have circumferential elements formed thereon, the foregoing elements cooperating to engage a turn of the spring therebetween, to thereby secure the spring to the fixture, in engagement with the head portion of the suspension member.

BRIEF DESCRIPTION OF THE DRAWINGS

FIG. 2 is a fragmentary side elevational view, in partial section, of the forward part of the toy of FIG. 1;

FIG. 3 is an exploded view of the forward part of the toy shown in FIG. 2, with additional portions shown in cross-section;

DETAILED DESCRIPTION OF THE ILLUSTRATED EMBODIMENTS

Figure 1:
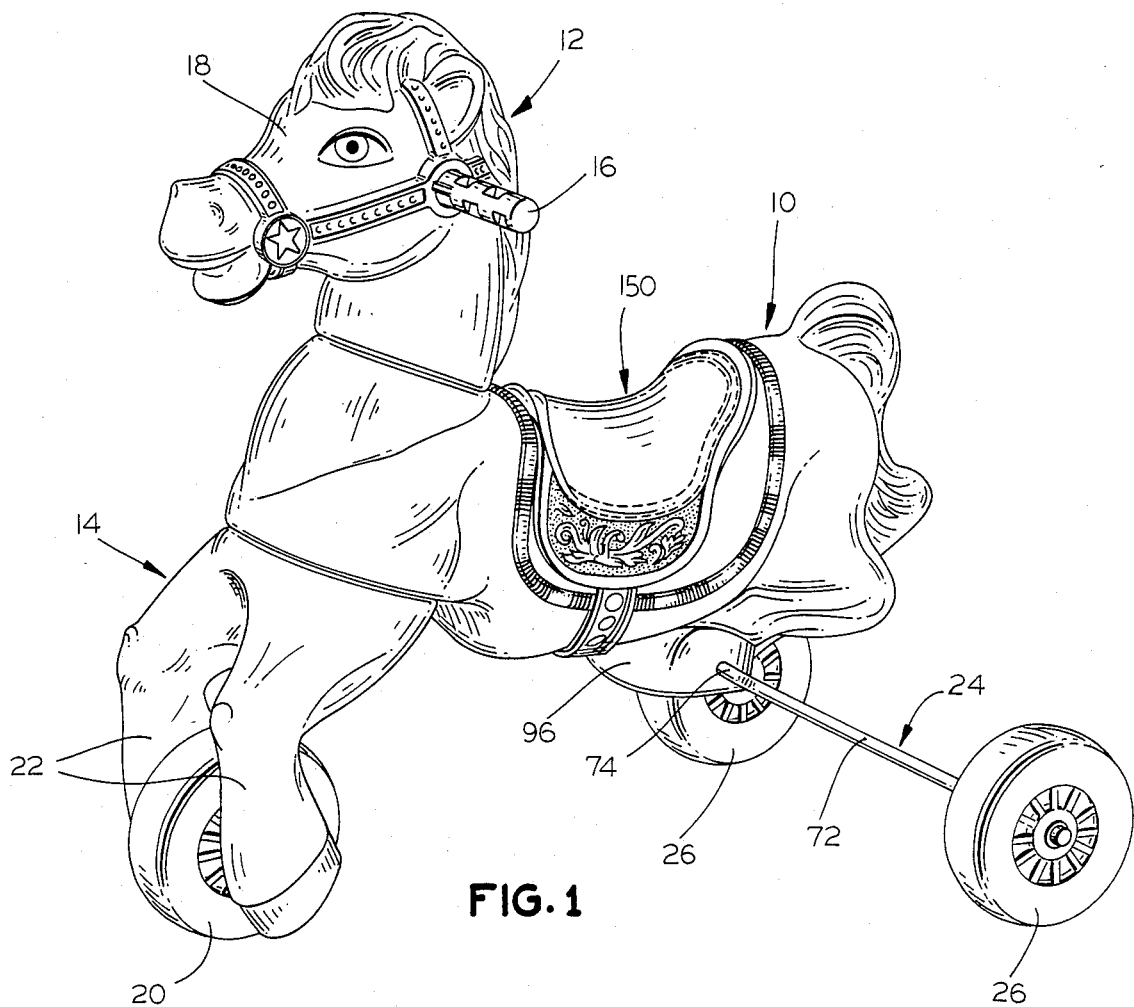
FIG. 1 is a perspective view of a toy embodying the present invention.

Turning now in detail to FIG. 1 of the appended drawings, therein illustrated is ride-on toy embodying the present invention, and constructed to simulate a horse. The toy consists of a body member, generally designated by the numeral 10, head and leg members, generally designed respectively by the numerals 12 and 14, mounted thereon, and a suspension system, generally designated by the numeral 24, including a pair of wheels 26. A handle grip 16 extends laterally through the head portion 18 of member 12, to permit gripping and turning by the child, and a wheel 20 is rotatably supported between the forelegs 22.

In FIGS. 2 and 3 the details of construction of the head member and leg member 12,14 are most clearly shown, as are the means by which they are assembled and are rotatably mounted in the forward part of the body member 10. The head member 12 includes of a post portion 28 projecting downwardly from the neck portion 30, and a cylindrical bearing portion 32 interposed adjacent the neck portion 34. A receptacle portion 36, of square cross-sectional configuration corresponding to the post portion 30, is formed into a central section 38 of the leg member 14. As seen in FIG. 2, the receptacle portion 36 receives the end of the post portion 30 and is affixed thereto by screws 40, thus securing the head member 12 and the leg member 14 in assembly and preventing axial displacement and relative rotation therebetween. A short upstanding square collar portion 42 on the leg member 14 cooperates to engage the post 30, and a cylindrical bearing portion 44 is formed adjacent thereto.

Each of the upper and lower walls 46,48, respectively, of the body member 10 has an opening 50 formed through it. The openings 50 are aligned with one another, and permit insertion of the head member 12 and the leg member 14 into the body member 10, as shown in FIG. 3. The surrounding structure of the walls 46 and 48 are formed into circumferential lip portions 51, which provide seats for the bearing portions 32,44 and permit facile rotational movement. Thus, it will be appreciated that the head and leg member assembly will turn as a unit in response to force on the handle grip 16, and such movement, independent of the body member 10, will significantly enhance the lifelike appeal of the toy.

Figure 4:
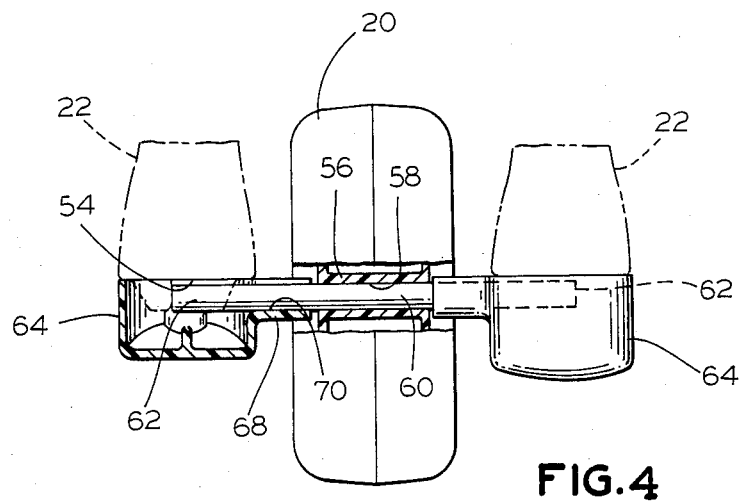
FIG. 4 is a sectional view of the front wheel mounting structure, taken along line 4—4 in FIG. 2 and drawn to an enlarged scale.

With additional specific reference now to FIG. 4, it can be seen that the bottom surface 52 of each of the legs 22 has a downwardly facing groove 54 formed into it, which extends partially thereacross from the inner edge of the leg. The wheel 20 has a hub 56 defining an axial bore 58, in which is received a metal axle piece 60. The opposite end portions 62 of the axle piece 60 are seated in the laterally aligned, downwardly facing grooves 54 in the legs 22, and are retained therein by the hoof-simulating caps 64, which are affixed to the lower end of surfaces 52 by screws 66. Each cap 64 has a laterally inwardly extending projection 68 of generally U-shaped cross-sectional configuration, defining upwardly opening channels 70 in which the end portions 62 of the axle 60 are also seated. Thus, caps 64 provide underlying support for the axle 60, and cooperate with the downwardly facing grooves 54 to securely mount the wheel assembly. The projections 68 serve the additional function of locating the wheel 20 in a centered position on the axle 60, by defining a limited free length thereof; the hub portion 56 of the wheel 20 will bear against the ends of the projections 68 when the limits of free movement have been reached.

Figure 5:
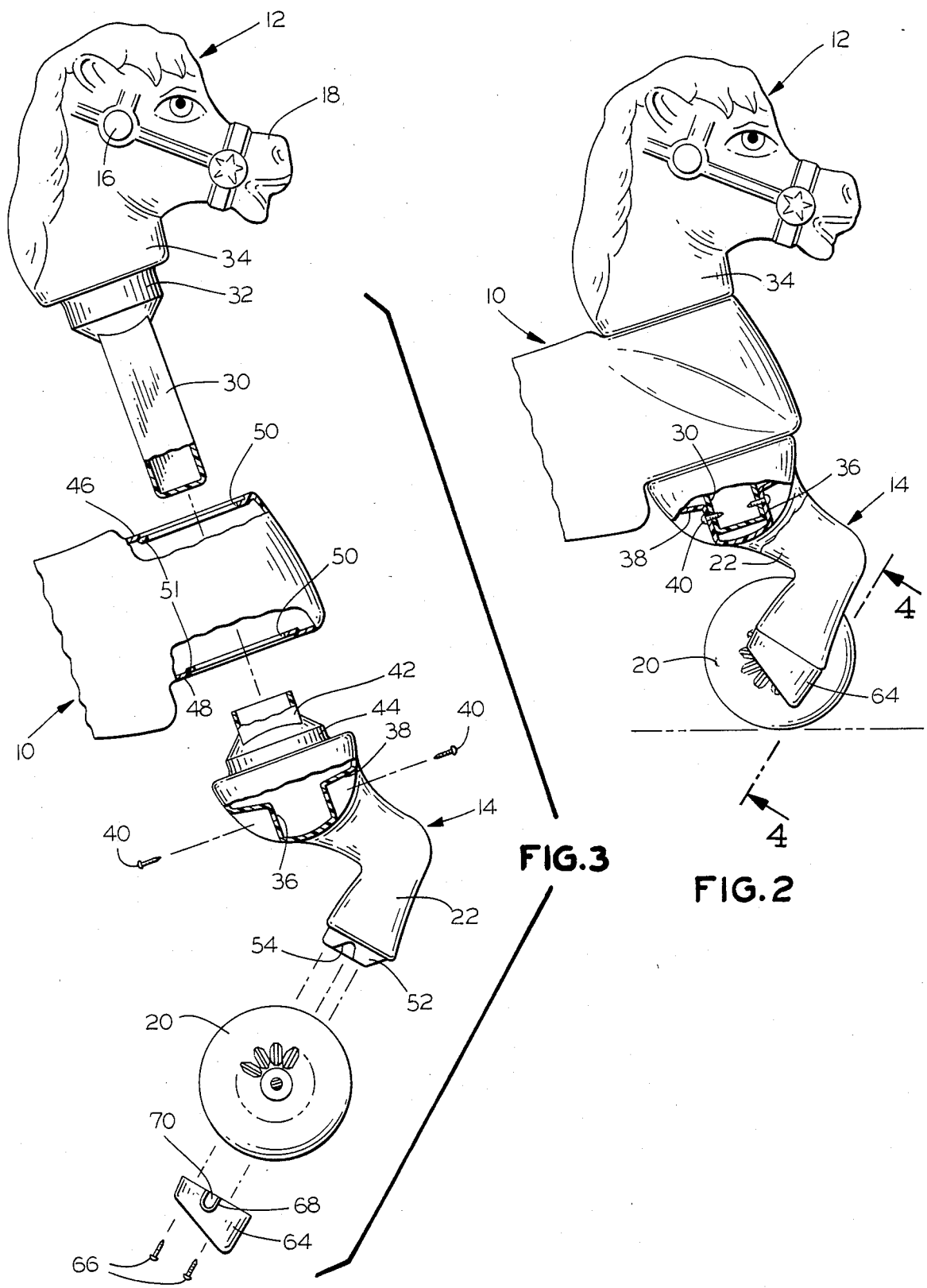
FIG. 5 is a side elevational view, in partial section, showing the body member and suspension system of the toy of FIG. 1, drawn to an enlarged scale.
Figure 6:
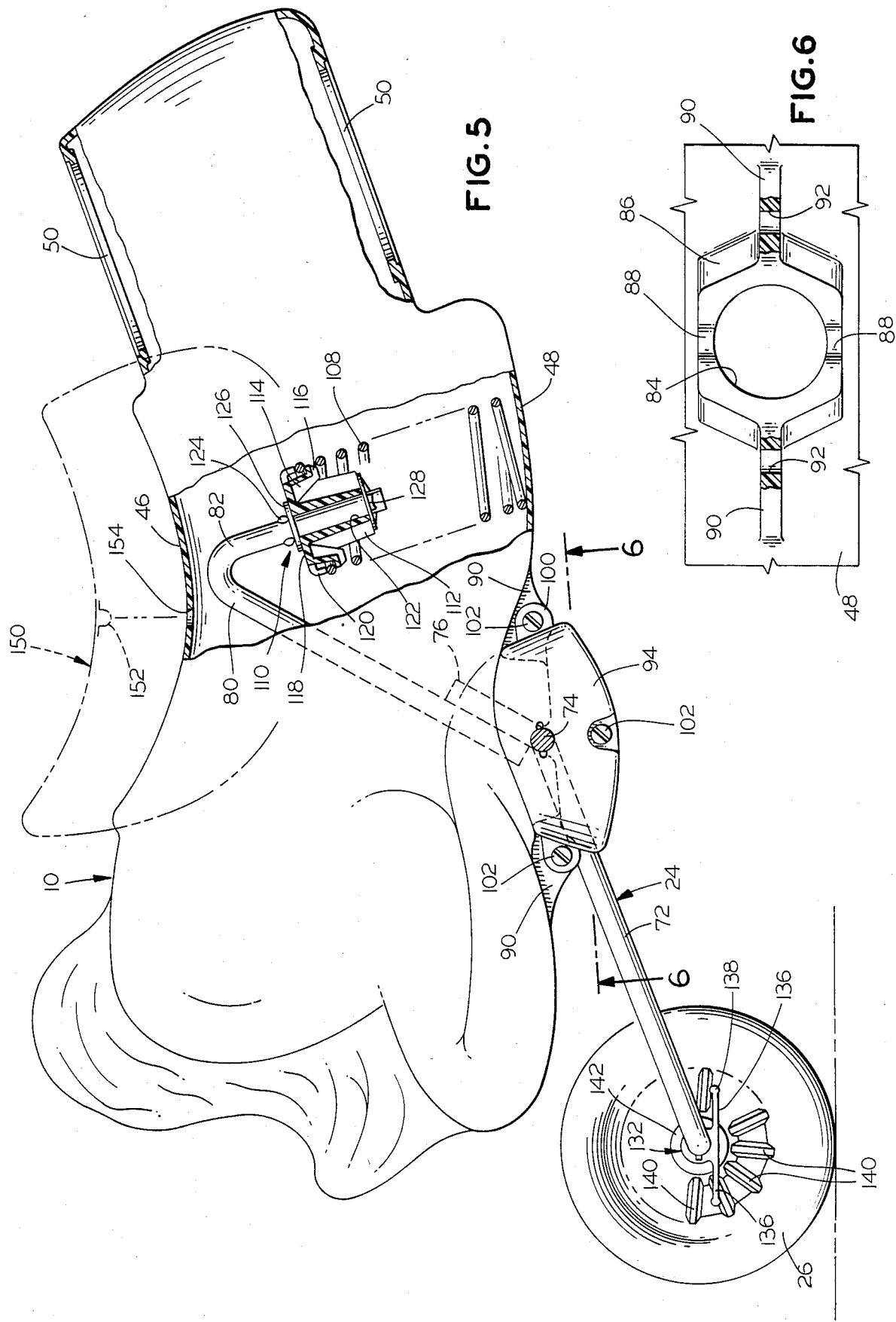
FIG. 6 is a fragmentary view, in partial section, of an area of the lower wall of the body member, taken along line 6—6 of FIG. 5.
Figures 7, 8:
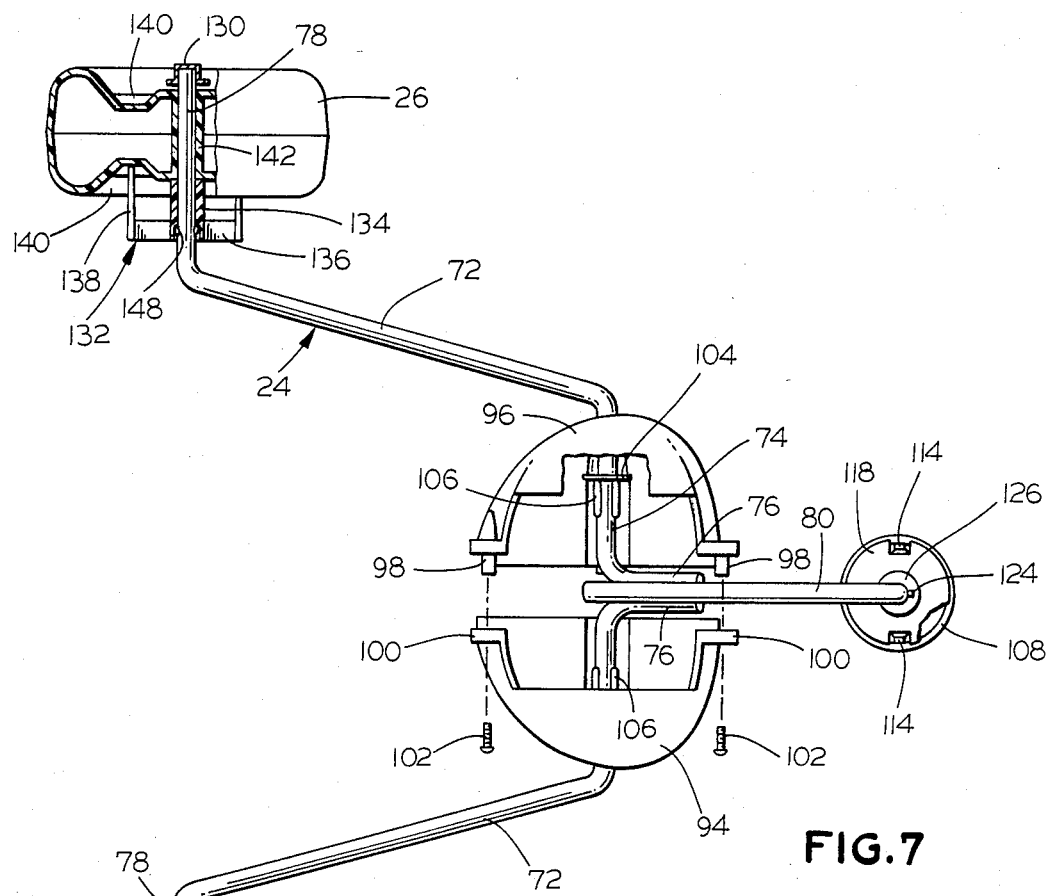
FIG. 7 is a plan view of the suspension system of the toy of FIG. 1, showing hoof-simulating covering pieces disposed in preassembly positions.
FIG. 8 is an enlarged perspective view of the axle-mounted "clicker" devices illustrated in FIGS. 5 and 7, with deflected positions of the ratchet fingers shown in phantom line.

The suspension system for the toy, and the means by which the body is mounted thereon, are shown in greatest detail FIGS. 5-7, to which specific reference is now made. The system includes a generally Y-shaped suspension member made of bent steel rod and comprised of three joined pieces; i.e., two lateral pieces and a headpiece. Each lateral piece consists of an arm portion 72, a shoulder portion 74, a neck portion 76, and an axle portion 78, with the neck portions 76 being so affixed as to dispose the lateral pieces in mirror image fashion.

The shoulder portions 74 extend outwardly from the neck portions 76 in axial alignment; the arm portions 72 diverge downwardly from the outer ends of the shoulder portions 74; and the axle portions 78 extend outwardly in opposite directions, and in axial alignment. The headpiece of the suspension member 24 consists of a neck portion 80 and a head portion 82. The neck portion 80 is affixed to the neck portions 76 of the lateral members substantially on the center-line of the toy, to extend upwardly therefrom; the head portion 82 projects in a generally downward direction from the upper end of the neck portion 80.

To receive the suspension system 24, the lower wall 48 is provided with a circular opening 84, disposed toward the rear of the body 10. The surrounding material is thickened, as at 86, to define downwardly opening channel portions 88, which extend in general lateral alignment from the opposite sides of the opening 84. The reinforcing structure also defines a pair of longitudinally aligned ears 90, through each of which passes a transversely extending aperture 92.

As can best be seen in FIG. 5, the entire headpiece of the suspension system, as well as the neck portions 76 of the lateral pieces thereof, are inserted through the lower wall opening 84, and reside within the interior body space. The shoulder portions 74 seat within the channel portions 88, and serve to pivotably support the body 10 upon the suspension system 24. The arms 72 project downwardly and rearwardly, and the wheels 26 are rotatably mounted on the axial portions 78.

A pair of side caps 94,96, molded in the form of simulated hooves, are provided to conceal the parts of the suspension system where it enters the body 10 and to enhance the lifelike appearance of the toy. As best seen in FIG. 7, small flanges provided at the ends of cap 96 carry short studs 98, which are received in the apertures 92 passing through the ears 90 of the lower wall reinforcing structure 86. Corresponding flanges 100 on the other cap 94 receive screws 102, which pass therethrough and are engaged within the studs 98, and a third screw 102 secures the caps to one another along their lower edges. A washer 104 is disposed within each cap 94,96 and cooperates with the flatted ears 106 on each of the shoulder portions 74, limiting inward movement of the associated cap and fixing it in proper position.

Coil spring 108 is secured to the head portion 82 of the suspension system 24 by a coupling fixture, which is generally designated by the numeral 110. The fixture 110 consists of a body portion 112, on which is disposed a pair of diametrically positioned, inwardly deflectable resilient fingers 114, and a top portion 118 having a depending flange element 120 extending substantially completely about its circumference. The elements 116 at the tips of the fingers are dimensioned and configured to enter between adjacent turns of the spring 108, and the flange element 120 is positioned to overlie fingers 114, and to cooperate with, the elements 116 to grip the spring coil. As will be appreciated, the spring 108 is mounted by inserting the axially projecting body 112 of the fixture 110 into its central opening, causing the fingers 114 to deflect inwardly, as necessary. After passing over the end-most turn, the fingers 114 will resume more outward positions, and will cooperatively grip the spring, as described. The head portion 82 of the suspension system 24 is inserted axially into the central bore 122 of the fixture body 112, to a depth that is limited by the flatted ears 124 formed thereon. Thrust washer 126 is disposed upon the upper surface of the top portion 120, to provide a hard and durable bearing surface, and a snap ring 128 is forced upon the protruding end of the head portion 82 to maintain the assembly.

As will be appreciated, the member 10 is resiliently supported upon the suspension system 24 by virtue of the biasing effect of the coil spring 108. The bottom end of the spring 108 acts against the inner surface of the lower wall 48, exerting an upward force upon the neck and head portions 82, 76, 80, and providing an internal stop, limiting travel of the head portion; this, in turn, limits downward movement of the body 10 and prevents it from bumping against the floor. The suspension system design also avoids any need for such adaptive modifications to the body as might detract significantly from its lifelike appeal.

The rear wheels 26 are secured on the axle portions 76 of the suspension system by friction nuts 130, which are forced over the protruding end portions. Inwardly of each rear wheel is disposed a "clicker" device, generally designated by the numeral 132, the construction of which is most clearly illustrated in FIG. 8. It consists of a tubular body portion 134, a laterally extending pair of arms 136 at one end of the body portion, and a pair of forwardly projecting flexible fingers 138 at the outer end of each arm. The tubular body portion 134 has a bore 144 extending axially through it, along opposite sides of which are formed axially extending grooves 146. Flatted ears 148 are formed on the axle portions 76 and are received in the grooves 146, to prevent rotation of the clicker 132 thereon. As can be seen, a wheel 26 and a clicker 132 are adjacently mounted, positioning the flexible fingers 138 to ride over the radially extending raised ribs 140, thereby producing a clicking sound as the fingers first deflect and then snap back against a following rib surface on the revolving wheel.

To complete the assembly, and to enhance the realistic appearance of the toy, a separate saddle member, generally designated by the numeral 150, is strapped about the body member 10. To properly locate and maintain it in position, a small boss 152 projects from the underside of the saddle member 150 and is engaged in the aperture 154, which is formed through the upper wall 46 of the body member 10.

Thus, it can be seen that the present invention provides a novel ride-toy which realistically simulates an animal, and especially a horse. The body member of the toy is fabricated separately from the head and foreleg members, and the latter can readily be assembled to one another for sturdy and positive independent steering action. The invention also provides a unique suspension system for such a toy, which is comprised of a minimum number of components, is readily assembled, affords improved performance, and does not require unnatural looking or expensive body modification. Required parts are few in number, and are quickly and easily assembled. The toy is relatively inexpensive to produce, and usually will be constructed largely of molded plastic parts; suitable materials for all components will, however, be evident to those skilled in the art.

Having thus described the invention, what is claimed is:

1. A child's ride-on toy adapted for facile assembly, including a rigid body member of hollow construction comprised of upper and lower walls, each of said walls having a relatively large circular opening formed therethrough to define a pair of generally vertically aligned seat portions in the forward part of said body member;

a head member mounted on said body member and extending downwardly through said opening in said upper wall; a leg member mounted on said body member and extending upwardly through said opening in said lower wall, said leg member having first ground-engaging wheel means thereon; cylindrical bearing portions on both said head member and said leg member, said bearing portions being received within said seat portions of said top and bottom walls, respectively, for pivotable movement of said head and leg members relative to said body member; means interengaging said head and leg members in assembly against relative rotation and axial displacement; and second ground-engaging wheels means on a rearward part of said body member.

2. The toy of claim 1 wherein said interengaging means comprises a single, integrally formed post portion extending axially from one of said head and leg members, and a corresponding integral receptacle portion provided on the other one thereof in which said post portion is received, the internal dimensions and configuration of said receptacle portion conforming closely to the external dimensions and configuration of an end section of said post portion, to permit facile assembly of said head and leg members and to prevent relative rotation therebetween.

3. The toy of claim 2 wherein said leg member comprises an upper central section and a pair of laterally spaced legs depending therefrom, said receptacle portion being formed in said central section and projecting downwardly therefrom between said legs, and said interengaging means including at least one fastener extending through said receptacle portion and said post portion end section.

4. The toy of claim 1 wherein said leg member comprises a pair of laterally spaced depending legs, each of said legs having a lower end surface defining a downwardly opening groove extending partially thereacross from the inner edge thereof, with said grooves being laterally aligned; and wherein said first wheel means comprises a wheel mounted on an axle having opposite end portions received in said aligned grooves of said legs, said leg member additionally including a retaining cap secured upon the lower end of each of said legs to hold said axle end portions in said end surface grooves.

5. The toy of claim 4 wherein each of said retaining caps includes a laterally inwardly extending projection defining an upwardly opening groove, said grooves of said projections cooperating with said grooves of said legs to support said axle end portions, the inner ends of said projections being spaced from one another to define a free length of said axle therebetween, serving to maintain said wheel in a centered position thereon.

6. A child's ride-on toy adapted for facile assembly, comprising a rigid body member of hollow construction including a lower wall having an opening formed therethrough toward the rear of said body member; a head and leg member assembly mounted on said body, said leg member having first ground-engaging wheel means thereon; and a suspension system mounted on a rearward part of said body member, said suspension system comprising a generally Y-shaped suspension member including a neck portion, a pair of shoulder portions extending laterally in opposite directions from one end of said neck portion, and an arm portion extending from the outer end of each of said shoulder portions in a direction generally opposite to that of said neck portion, said shoulder portions pivotably supporting said body member, said neck portion extending generally upwardly therefrom through said lower wall opening, and said arm portions extending generally downwardly therefrom and having ground-engaging wheel members rotatably mounted adjacent the lower ends thereof, said suspension member also including a head portion extending generally forwardly and downwardly from the opposite end of said neck portion, and a biasing member secured to said head portion, said biasing member normally bearing upon an inside surface portion of said lower wall of said body member to exert an upward bias upon said head portion and a downward bias upon said arm portions of said suspension member, whereby the weight and inertia of a child and the force of said biasing member permit a bouncing action mode of movement in said body member.

7. The toy of claim 6 wherein said lower wall has integrally formed reinforcing elements extending about said opening thereof, said reinforcing elements defining laterally aligned groove portions extending from the opposite sides of said opening, said shoulder portions of said suspension member being seated in said groove portions for pivotable support of said body member thereon.

8. The toy of claim 6 wherein said biasing member is a coil spring, and wherein said suspension system additionally includes a connecting fixture securing said coil spring to said head portion of said suspension means, said fixture comprising a body portion of generally circular cross-section dimensioned for axial insertion into one end of said coil spring, and having an axial bore in which is received a free end section of said head portion, and at least one pair of radially outwardly biasing, flexible fingers diametrically disposed on said body portion with elements configured to enter the space between adjacent turns of said spring, said fixture also have a cap portion at the upper end of said body portion with depending circumferential elements formed thereon, said elements of said flexible fingers and of said cap portion cooperating to engage a turn of said spring therebetween, to secure said spring to said fixture in engagement with said head portion of said suspension member.

* * * * *